(12) United States Patent
Brown et al.

(10) Patent No.: US 9,459,807 B2
(45) Date of Patent: Oct. 4, 2016

(54) METHODS AND SYSTEMS FOR PROVIDING RESOURCES FOR CLOUD STORAGE

(71) Applicant: QUALCOMM Incorporated, San Diego, CA (US)

(72) Inventors: Craig Matthew Brown, New South Wales (AU); Michael William Paddon, Tokyo-to (JP)

(73) Assignee: QUALCOMM INCORPORATED, San Diego, CA (US)

( * ) Notice: Subject to any disclaimer, the term of this patent is extended or adjusted under 35 U.S.C. 154(b) by 875 days.

(21) Appl. No.: 13/826,009

(22) Filed: Mar. 14, 2013

(65) Prior Publication Data

US 2014/0280668 A1     Sep. 18, 2014

(51) Int. Cl.
*G06F 15/173*     (2006.01)
*G06F 3/06*       (2006.01)

(52) U.S. Cl.
CPC ........... *G06F 3/0631* (2013.01); *G06F 3/0605* (2013.01); *G06F 3/067* (2013.01); *G06F 3/0644* (2013.01)

(58) Field of Classification Search
CPC .. G06F 3/0631; G06F 3/0605; G06F 3/0644; G06F 3/067
USPC ................. 709/212, 213, 220, 226
See application file for complete search history.

(56) References Cited

U.S. PATENT DOCUMENTS

| | | | |
|---|---|---|---|
| 8,285,747 B1 | 10/2012 | English | |
| 8,364,802 B1* | 1/2013 | Keagy | G06F 8/63 709/223 |
| 2002/0129049 A1 | 9/2002 | Collins et al. | |
| 2003/0172146 A1 | 9/2003 | Collins | |
| 2006/0136446 A1 | 6/2006 | Hughes et al. | |
| 2008/0077638 A1* | 3/2008 | Monk | G06F 17/30138 |
| 2009/0055682 A1* | 2/2009 | Gibson | G06F 11/1076 714/6.12 |
| 2011/0138050 A1* | 6/2011 | Dawson | G06F 9/5072 709/226 |
| 2012/0198443 A1 | 8/2012 | Tatavarty | |
| 2012/0239896 A1 | 9/2012 | Sobel | |
| 2013/0191347 A1* | 7/2013 | Bensinger | G06F 11/1412 707/649 |
| 2013/0339470 A1* | 12/2013 | Jeswani | H04L 67/1097 709/213 |
| 2014/0280668 A1* | 9/2014 | Brown | G06F 3/0605 709/213 |

FOREIGN PATENT DOCUMENTS

WO       2010104814 A1       9/2010

OTHER PUBLICATIONS

International Search Report and Written Opinion—PCT/US2014/022693—ISA/EPO—2014.

(Continued)

*Primary Examiner* — Michael Y Won
(74) *Attorney, Agent, or Firm* — Muncy, Geissler, Olds & Lowe, P.C.

(57) ABSTRACT

Methods and apparatus for providing resources for cloud storage may include accessing physical storage capacity on a device, connected to a network cloud, including a virtual primary storage disk and at least one virtual secondary storage disk having access to the physical storage capacity. In addition, the methods and apparatus may include dynamically updating the available storage capacity of the virtual secondary storage disk for network cloud storage based upon usage of the physical storage capacity by the virtual primary storage disk and the virtual secondary storage disk.

25 Claims, 11 Drawing Sheets

(56) References Cited

OTHER PUBLICATIONS

"SCSI Write Commands", From Wikipedia, the free encyclopedia, retrieved from Internet, URL: https://en.wikipedia.org/wiki/SCSI_Write_Commands, Jun. 30, 2016, 1 page.

Seagate, "SCSI Commands Reference Manual," Parallel SCSI, Fibre Channel (FC), Serial Attached SCSI (SAS), 100293068, Rev. C, Apr. 2010, 446 pages.

* cited by examiner

METHODS AND SYSTEMS FOR PROVIDING RESOURCES FOR CLOUD STORAGE

BACKGROUND

As cloud storage becomes more popular, more users are using cloud resources for the storage of data. In addition, users are joining cloud network groups where the user devices provide storage resources for the cloud. Generally, when users join a cloud network group, the user must designate an amount of free disk space for allocation to the cloud. When a user has used up all of the storage available for the user, the user typically cannot access the amount of disk space allocated to the cloud. As such, the local user must request and negotiate with the cloud to reclaim the cloud allocated storage. Therefore, every time the user needs additional space, the user must go back to the cloud and request additional storage. Because the local user must send a request to the cloud for additional space and may need to negotiate with the cloud for the additional space, the local user may experience a significant delay before space is available for use by the local user.

Thus, it would be desirable for users to join cloud networks without having to allocate a specific amount of storage for use by the cloud.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for providing resources for cloud storage. The method may include accessing physical storage capacity on a device, connected to a network cloud, including a virtual primary storage disk and at least one virtual secondary storage disk having access to the physical storage capacity. The method may also include dynamically updating the available storage capacity of the virtual secondary storage disk for network cloud storage based upon usage of the physical storage capacity by the virtual primary storage disk and the virtual secondary storage disk.

Another aspect relates to at least one processor configured for providing resources for cloud storage. The processor may include a first module for accessing physical storage capacity on a device, connected to a network cloud, including a virtual primary storage disk and at least one virtual secondary storage disk having access to the physical storage capacity. In addition, the processor may include a second module for dynamically updating the available storage capacity of the virtual secondary storage disk for network cloud storage based upon usage of the physical storage capacity by the virtual primary storage disk and the virtual secondary storage disk.

Yet another aspect relates to a computer program product. The computer program product may include a computer-readable medium including at least one instruction for causing a computer to access physical storage capacity on a device, connected to a network cloud, including a virtual primary storage disk and at least one virtual secondary storage disk having access to the physical storage capacity. The computer-readable medium may also include at least one instruction for causing the computer to dynamically update the available storage capacity of the virtual secondary storage disk for network cloud storage based upon usage of the physical storage capacity by the virtual primary storage disk and the virtual secondary storage disk.

Another aspect relates to an apparatus which may include means for accessing physical storage capacity on a device, connected to a network cloud, including a virtual primary storage disk and at least one virtual secondary storage disk having access to the physical storage capacity. In addition, the apparatus may include means for dynamically updating the available storage capacity of the virtual secondary storage disk for network cloud storage based upon usage of the physical storage capacity by the virtual primary storage disk and the virtual secondary storage disk.

Yet another aspect relates to an apparatus for providing resources for cloud storage. The apparatus may include an access component operable to access physical storage capacity on a device, connected to a network cloud, including a virtual primary storage disk and at least one virtual secondary storage disk having access to the physical storage capacity. The apparatus may further include an update component operable to dynamically update the available storage capacity of the virtual secondary storage disk for network cloud storage based upon usage of the physical storage capacity by the virtual primary storage disk and the virtual secondary storage disk.

Another aspect relates to a method for assigning a priority value to virtual storage space. The method may include monitoring, via a network cloud, a usage of virtual storage space on a device by the network cloud. The method may also include determining, via a processor, a priority value for the virtual storage space used by the network cloud. In addition, the method may include sending at least one priority message with the priority value for the virtual storage space to the device.

Still another aspect relates to at least one processor configured for assigning a priority value to virtual storage space. The processor may include a first module for monitoring, via a network cloud, a usage of virtual storage space on a device by the network cloud. The processor may additionally include a second module for determining a priority value for the virtual storage space used by the network cloud. The processor may also include a third module for sending at least one priority message with the priority value for the virtual storage space to the device.

Another aspect relates to a computer program product. The computer program product may include a computer-readable medium including at least one instruction for causing a computer to monitor, via a network cloud, a usage of virtual storage space on a device by the network cloud. In addition, the computer-readable medium may include at least one instruction for causing the computer to determine a priority value for the virtual storage space used by the network cloud. The computer-readable medium may further include at least one instruction for causing the computer to send at least one priority message with the priority value for the virtual storage space to the device.

Another aspect relates to an apparatus. The apparatus may include means for monitoring, via a network cloud, a usage of virtual storage space on a device by the network cloud. The apparatus may also include means for determining a priority value for the virtual storage space used by the network cloud. The apparatus may additionally include means for sending at least one priority message with the priority value for the virtual storage space to the device.

Yet another aspect relates to an apparatus for assigning a priority value to virtual storage space. The apparatus may include a virtual space monitoring component operable to monitor a usage of virtual storage space on a device by a network cloud. In addition, the apparatus may include a determining component operable to determine a priority value for the virtual storage space used by the network cloud. The apparatus may also include a notification component operable to send at least one priority message with the priority value for the virtual storage space to the device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and apparatus for providing storage for the cloud. The cloud may include a loose dynamic federation of network capable peer devices (e.g., devices may join and leave the cloud). Within the cloud, devices may cooperate to achieve common goals. In addition, communications may be peer to peer, or relayed via other cloud members. In particular, the described aspects may pool the available storage space from devices on a network to provide the available resources for storage on the cloud. The described aspects provide a local storage having all free disk space logically available to both a virtual primary disk for the local user and one or more virtual secondary disks for the cloud, where the local user can claim or reclaim space as needed each time the local user (not the cloud) requires more space. Thus, the local user does not give up access to local storage when joining the cloud.

In contrast to the method and apparatus described herein, prior art systems require a user to designate an amount of free disk space for allocation to the cloud ("cloud allocation storage"), and as such the cloud allocation storage is not available to the local user. In these prior art systems, the local user must request and negotiate with the cloud to reclaim the cloud allocated storage. Because the local user must send a request to the cloud for additional space and may need to negotiate with the cloud for the additional space, the local user may experience a significant delay before the space is available for use by the local user.

Figure 1A:
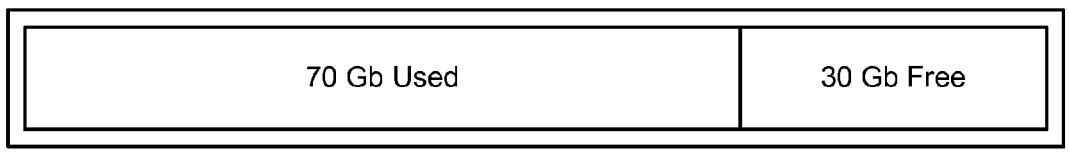
FIGS. 1A-1D illustrate example prior art systems where the local user designates free disk space for allocation to the cloud.
Figure 1B:
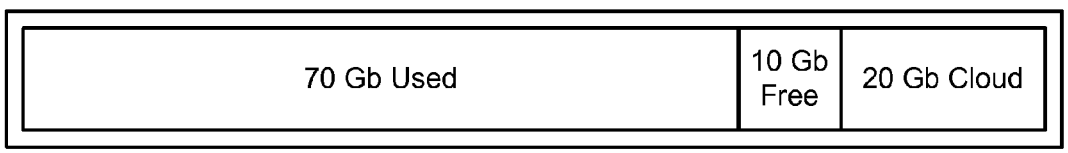

Referring now to FIGS. 1A-1D, illustrated therein is example prior art systems where the local user designates free disk space for allocation to the cloud. FIG. 1A illustrates an example host system without a cloud. The host system has 100 Gb local disk 100, of which 70 Gb of the local disk space is initially used by the host system and 30 Gb is free. In this example, only the host system may use the resources of local disk 100. FIG. 1B illustrates an example where the host system and a cloud system both have access to local disk 100. As illustrated, the local user initially reserves 10 Gb of free space from local disk 100 for itself and allocates the remaining 20 Gb of free space from local disk 100 to the cloud for use by the cloud.

Figure 1C:
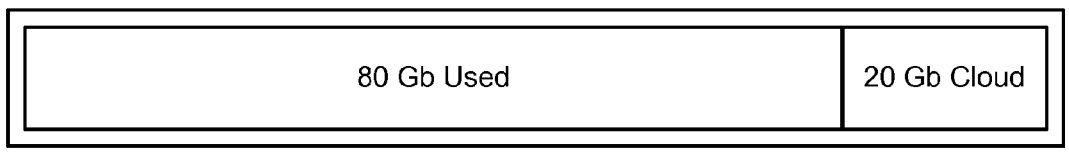
Figure 1D:

When the local user uses up the reserved 10 Gb space (e.g., the local user has used 80 Gb of space from the local disk 100), as illustrated in FIG. 1C, the local user must make a request to the cloud to take back or reclaim additional space from the cloud in order to have free disk space to use. As such, until the local user sends the request to the cloud to take back or reclaim additional space from the cloud, the local user has 0 Gb of space to use until the local user can negotiate with the cloud for additional space. Moreover, the local user may have to wait for the cloud to respond to the request and to copy data out of the way and make the space available for the local user. FIG. 1D illustrates an example where the local user request an additional 10 Gb of free space from the 20 Gb initially allocated to the cloud for use. Otherwise, without requesting to reclaim space from the cloud, the remaining disk space 20 Gb (FIG. 1C) is allocated to the cloud and not available to the local user.

The described aspects overcome these complications by making all free disk space on the local disk available to both the cloud and the local user, but allowing the local user to immediately reclaim any needed disk space. In other words, the disk space available to the cloud is dynamically adjusted based on the disk space used by the local user. Thus, in contrast to prior art systems that may only track whether the disk space is in use or free, e.g., solid state drives (SSDs), the described aspects may track whether the virtual primary disk space for the local user is in use, whether the virtual secondary disk(s) space is in use, or whether the virtual primary disk space and the virtual secondary disk(s) are free. In the described aspects, the local user is not required to negotiate with the cloud to reclaim disk space, as none of the disk space is reserved for exclusive use of the cloud. Instead, the local user and the cloud have equal access to any free disk space, but the local user has priority over the cloud to use any free disk space or to reclaim disk space being used by the cloud. As such, the local user "sees" the disk space used by the cloud as "available" disk space, and as the local user fills their disk space, the storage available to or used by the cloud is reclaimed.

Figure 2:
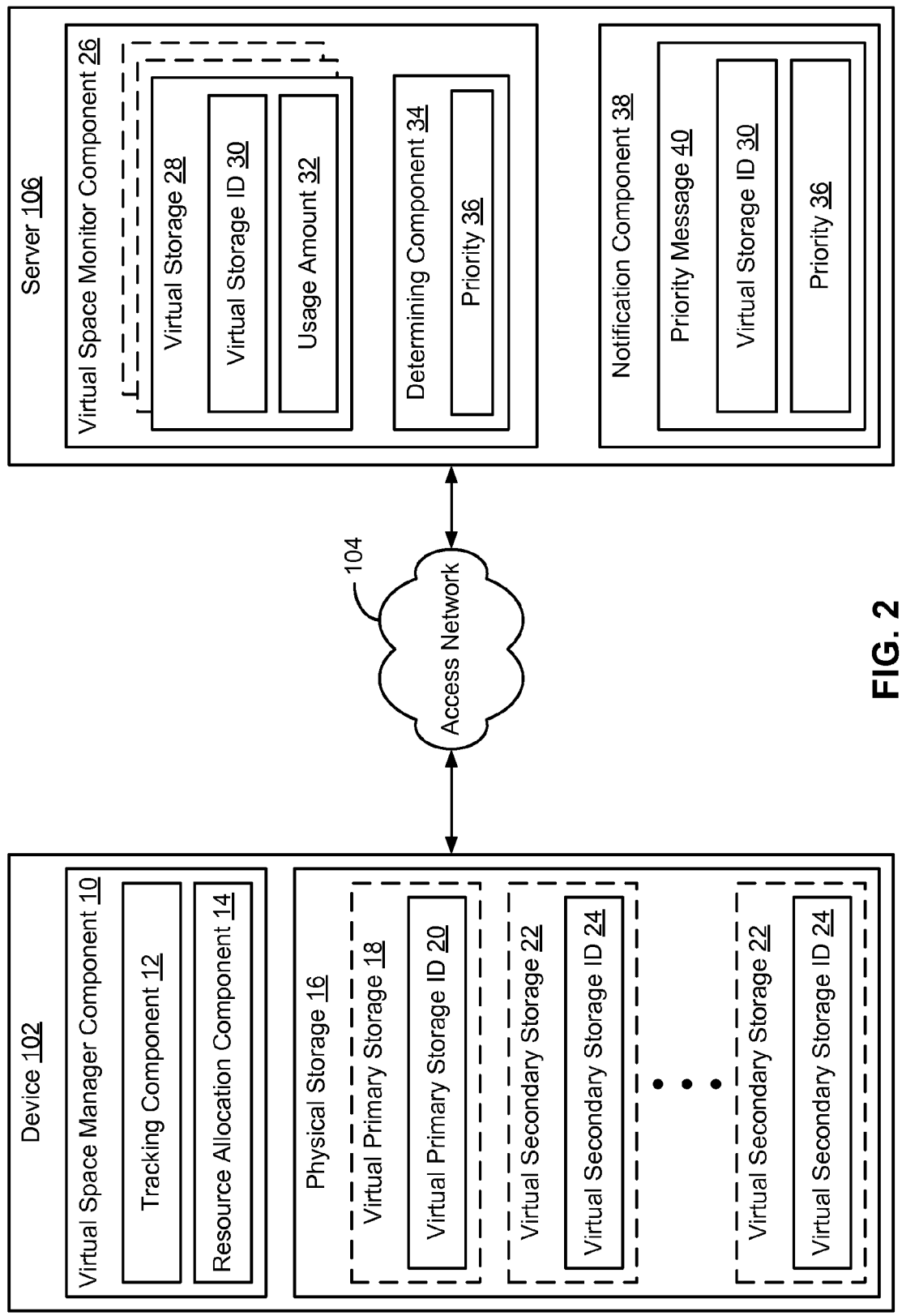
FIG. 2 is an illustration of an example connectivity system in accordance with an aspect.

Referring now to FIG. 2, illustrated is an example system 200 for providing resources for cloud storage in accordance with an aspect. System 200 may include one or more devices 102 communicating with one or more servers 106 via an access network 104. In an aspect, server(s) 106 may reside on a cloud network and device(s) 102 may provide storage resources for the cloud network, e.g., the cloud. The cloud may include a loose dynamic federation of network capable peer devices (e.g., devices may join and leave the cloud). Thus, server(s) 106 may have access to a plurality of storage resources from a plurality of devices 102.

Device 102 may include any mobile, portable computing or communications device, such as a cellular device, that may connect to an access network 104. Device 102 may be, for example, a cellular telephone, a navigation system, a computing device, a camera, a PDA, a music device, a gaming device or a handheld device having wireless connection capability, among other devices. Server/computing device 106 may include any mobile or fixed computing device connected to a network.

In addition, access network 104 may provide one or more types of communication connections, such as any type of wireless airlink, to device 102 and server 106. Device 102 may place and/or receive a communication, e.g., a telephone call, a conference call, a video conferencing call, an Internet Protocol session, a Voice Over Internet protocol (IP) call, a short message service (SMS) message, a multimedia messaging service (MMS) message, an instant messaging (IM) service message, a chat or net-meeting related connection, a video, music, or data transfer, among other communications, via access network 104 to and/or from one or more servers 106. In addition, device 102 may receive a communication via access network 104 from one or more servers 106, or from any other device in communication with access network 104.

Device 102 may include a physical storage disk 16 that may be represented as a plurality of virtual disks. Physical storage disk 16 may include, but is not limited to, solid state drives (SSD) and hard disk drives (HHD). The plurality of virtual disks may include a virtual primary storage disk 18 and one or more secondary storage disk(s) 22. Virtual primary storage disk 18 and the one or more secondary storage disk(s) 22 may be associated with an identification that identifies the respective storage disk (e.g., virtual primary storage ID 20 and virtual secondary storage ID 24). In an aspect, primary storage disk 18 may be used by the operating system of the device for storage while the one or more secondary storage disks 22 may be used by the cloud for storage. In another aspect, the one or more secondary storage disks 22 may also be used by an operating system running on device 102.

The virtual primary storage disk 18 may have access to the entire storage capacity available on the physical storage disk 16. The secondary storage disk(s) 22 may have access to the remaining storage capacity (e.g., remaining storage capacity=total physical storage capacity—primary storage capacity used) on the physical storage disk 16, e.g., for use by the cloud. As such, initially (e.g., prior to any use of physical storage disk 16), both the virtual primary storage disk 18 and the virtual secondary storage disk(s) 22 may be represented as having available for use the total physical storage capacity of the physical storage disk 16. Subsequently, as the primary storage disk 18 uses the available storage capacity, the remaining storage capacity available for the secondary storage disk(s) 22 may be correspondingly reduced. In addition, as the primary storage disk 18 frees space, the newly available space would become available for use by the secondary storage disk(s) 22. It should be noted, however, that in some aspects the virtual primary storage disk 18 may have access to the total physical storage capacity of the physical storage disk 16 at any time, as discussed below. Therefore, the sharing of the physical storage disk 16 between the primary storage disk 18 and the secondary storage disk(s) 22 may be fluid and dynamically adjusted based upon the resources used by the primary storage disk 18.

Device 102 may also include a virtual space manager component 10 that is operable to manage the available space for the primary storage disk 18 and the one or more secondary storage disk(s) 22. Virtual space manager component 10 may reside in firmware on device 102 or an operating system running on device 102. Virtual space manager component 10 may include a tracking component 12 operable to track the storage capacity usage of the primary storage disk 18 and the secondary storage disks 22. Virtual space manager component 10 may also have a resource allocation component 14 operable to allocate storage capacity to the primary storage disk 18 and the secondary storage disk 22.

Figure 3:
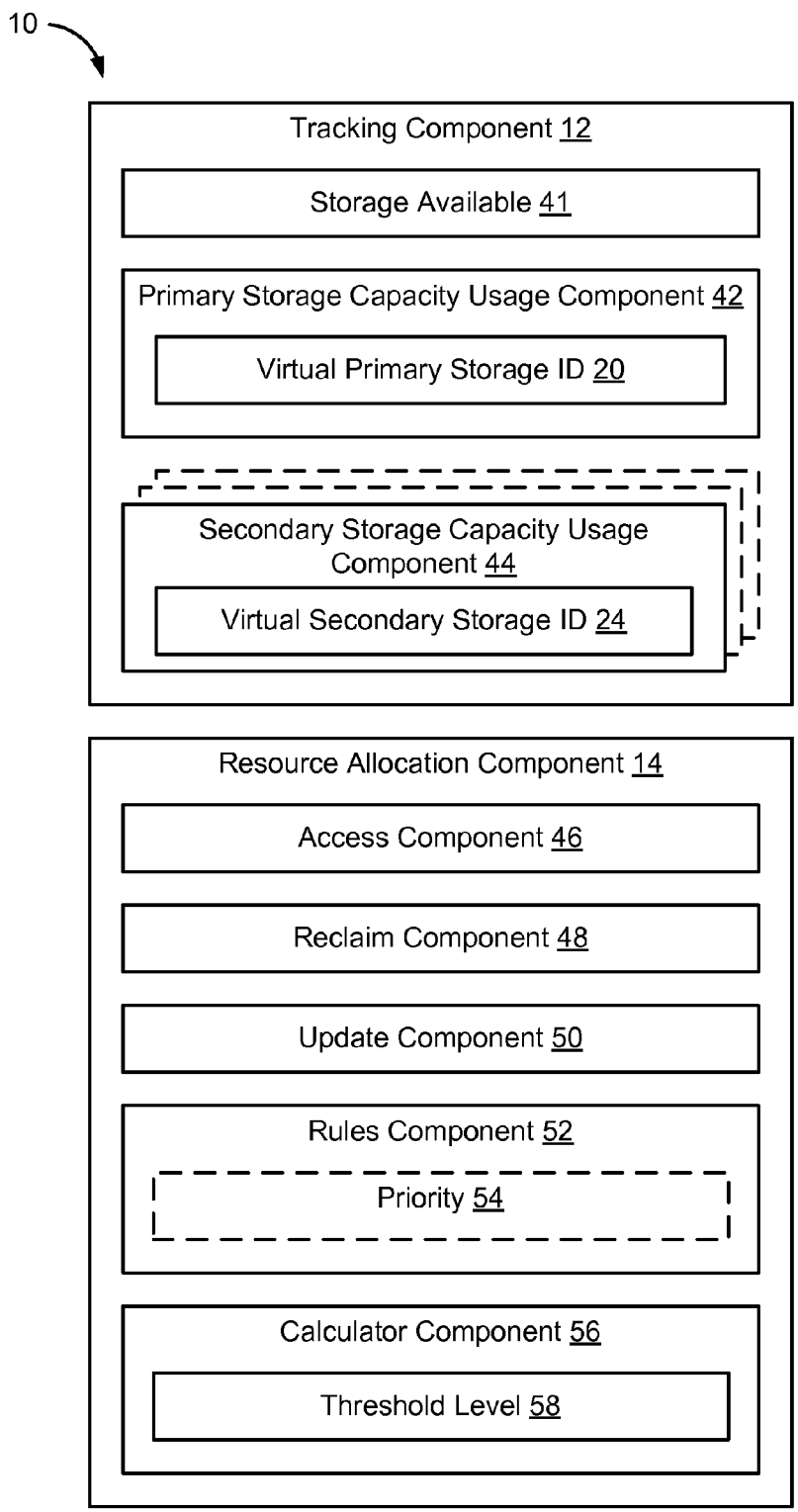
FIG. 3 is an illustration of an example virtual space manager component in accordance with an aspect.

Referring now to FIG. 3, illustrated therein is an example virtual space manager component 10 in accordance with an aspect. As discussed above, virtual space manager component 10 may include tracking component 12. Tracking component 12 may keep a list of the used resources, the available resources, and which storage disks (e.g., primary storage disk 18 or secondary storage disk 22) are using the resources. In an aspect, tracking component 12 may determine that a block of the primary storage disk 18 and/or the secondary storage disk 22 is in use when the operating system reads or writes to the block. In addition, tracking component 12 may determine the block is free when the operating system issues a discard directive or similar instruction. For example, tracking component 12 may include a storage available component 41 operable to track the total storage available on physical storage disk 16 (FIG. 1). In addition, tracking component 12 may include a primary storage capacity usage component 42 operable to track the resources used by the virtual primary storage ID 20. Tracking component 12 may further include a secondary storage capacity usage component(s) 44 operable to track the resources used by the virtual secondary storage ID 24. Thus, tracking component 12 may dynamically update the primary storage capacity usage component 42 and the secondary storage capacity usage component(s) 44 as the usage of the primary storage disk 18 and the secondary storage disk(s) 22 increase and/or decrease.

Virtual space manager component 10 may also include resource allocation component 14. Resource allocation component 14 may receive a request to save data, e.g., from an application on device 102 and/or from the cloud, and may interface with tracking component 12 to determine whether storage capacity is available on the respective storage disk. Resource allocation component 14 may include an access component 46 operable to access the primary storage disk 18 and/or the secondary storage disk(s) 22 in response to receiving the request to save data.

In an aspect, if an application on device 102, in other words the user of device 102, is requesting to save data and all of the available storage capacity of the physical storage disk 16 are currently being used by primary storage disk 18 and secondary storage disk(s) 22, resource allocation component 14 may include a reclaim component 48 operable to reclaim some or all of the storage capacity being used by the secondary storage disk(s) 22 so that primary storage disk 18 may use the reclaimed storage capacity to save the data. In other words, if storage space is not available, then the primary storage may immediately reclaim the storage space being used by the secondary storage disk(s) 22. Resource allocation component may also include an update component 50 operable to update the resources used by primary storage disk 18 and/or the secondary storage disk(s) 22 as resources are used and/or released by the primary storage disk 18 and the secondary storage disk(s) 22.

In an aspect, if an operating system running on device 102 is requesting to save data to a secondary storage disk 22 and the secondary storage disk 22 has been reclaimed, e.g., reallocated for use by primary storage disk 18, the operating system may receive an error message. For example, the error message may indicate that the secondary storage disk 22 has been reallocated for use by the primary storage disk 18 and is not available for use by the operating system. In addition, the error message may provide advance warning that the secondary storage disk 22 may be reallocated for use by the primary storage disk 18. In an aspect, the cloud may receive the error message during a read operation and may need to determine an alternate location of the data to read the data from (e.g., a redundant data location). In another aspect, a race condition may occur during a write procedure. For example, the cloud may query whether space is available and between the query and the actual write operation, the operating system may reclaim the space. As such, upon receiving the error message, the cloud may determine an alternative empty location to store the data.

Resource allocation component 14 may further include a rules component 52 operable to apply one or more algorithms in determining which storage capacity to reclaim from secondary storage disk(s) 22 for use by the primary storage disk 18. Rules component 52 may interface with reclaim component 48 to aid in determining which storage capacity should be reclaimed from secondary storage disk(s) 22. In an aspect, rules component 52 may apply a priority 54 to the data, e.g., files, saved on secondary storage disk(s) 22 to reclaim the storage capacity used by the files with the lower priority first. In another example, rules component 52 may apply an algorithm to reclaim storage capacity based upon frequency of use of files, and/or when the files were last accessed, among other methods for reclaiming storage capacity.

Resource allocation component 14 may also include a calculator component 56 operable to calculate a threshold level 58 of storage capacity that the secondary storage disk(s) 22 may be able to access. For example, resource allocation component 14 may determine that the secondary storage disk(s) 22 may access 90% of the available space, thereby maintaining some minimum amount of storage capacity exclusively for the use of virtual primary storage disk 18 and hence the user of device 102. Thus, in some aspects, as the primary storage increases, the secondary storage may decrease enough to fit the primary storage, or may decrease extra to maintain the minimum threshold.

Referring back to FIG. 2, server 106 may include a virtual space monitor component 26 operable to monitor the various virtual storage(s) 28 being used by server 106. For example, server 106 may be able to access virtual storages 28 from one or more devices 102. Virtual storage 28 may be associated with a virtual storage ID 30 that may identify which device 102 the virtual storage 28 is associated with. In addition, virtual storage 28 may include a usage amount 32 so that virtual space monitor component 26 may be able to identify and keep track of the amount of resources being used by server 106.

Virtual space monitor component 26 may also include a determining component 34 operable to determine a priority 36, such as an importance of the data being stored by virtual storage 28. For example, server 106 may assign a priority to the data being stored by virtual storage 28. In an aspect, priority 36 may be used to determine which order the virtual storage 28 may be reclaimed by primary storage disk 18 (e.g., reclaim the storage capacity used by the files with the lower priority first).

In addition, server 106 may include a notification component 38 operable to send priority message(s) 40 to device 102. Priority message 40 may identify a priority 36 for the virtual storage 28. Priority message 40 may include, for example, a virtual storage ID 30 identifying the virtual storage 28 associated with the priority 36. Notification component 38 may receive the priority 36 from determining component 34. In an aspect, notification component 38 may interface with the resource allocation component 14 associated with the device 102 for the virtual storage ID 30 so that resource allocation component 14 may use priority 36 when determining which virtual secondary storage disk 22 to reclaim from server 106. It should be noted that priority 36 may be dynamically updated as files are stored and/or released from virtual storage 28, and therefore, notification component 38 may send a plurality of priority messages 40 to resource allocation component 14 as the priority 36 is updated.

Figure 4:
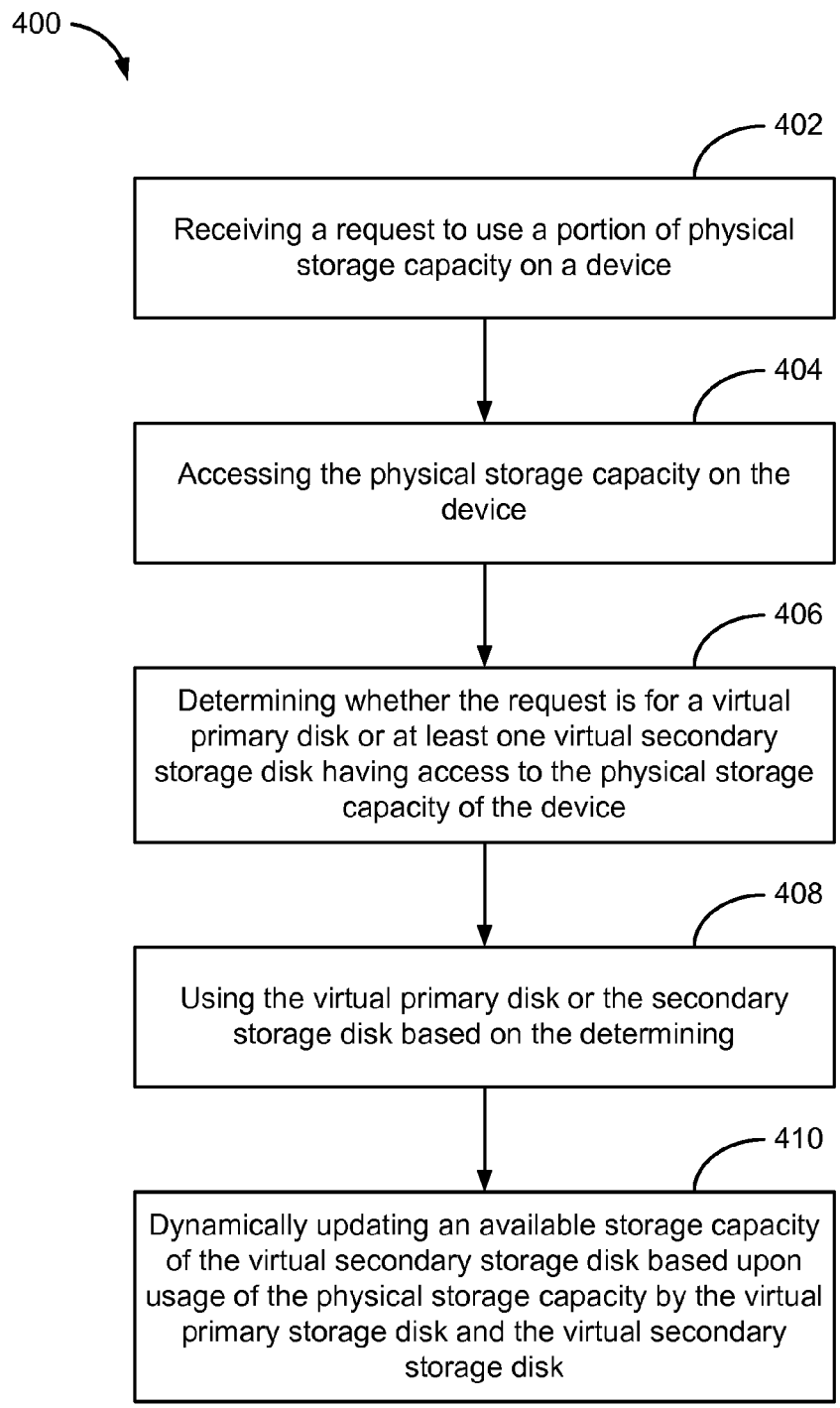
FIG. 4 is a flow chart illustrating a method for providing resources for cloud storage in accordance with another aspect.

Referring now to FIG. 4, a method 400 for providing resources for cloud storage in accordance with an aspect includes, at 402, receiving a request to use a portion of physical storage capacity on a device. A request to use a portion of physical storage capacity on a device may include, but is not limited to, a storage request from an application running on the device, a user requesting to store information on the device, a read or write request from an operating system running on the device, and a storage request from a server on the cloud, etc. In an aspect, resource allocation component 14 (FIG. 1) may receive a request to save data, e.g., from an application on device 102 (FIG. 1) and/or from the cloud.

The method may also include, at 404, accessing the physical storage capacity on the device. The physical storage capacity may be represented as a plurality of virtual disks, such as a virtual primary storage disk and one or more secondary storage disk(s). For example, an access component 46 (FIG. 2) may be able to access the virtual primary storage disk and one or more secondary storage disks.

At 406, the method may include determining whether the request is for a virtual primary disk or at least one virtual secondary storage disk having access to the physical storage capacity of the device. In an aspect, resource allocation component 14 may determine whether the request is for the virtual primary disk or at least one virtual secondary storage disk.

The method may further include, at 408, using the virtual primary disk or the secondary storage disk based on the determining. For example, access component 46 may access and use the virtual primary disk or the secondary storage disk based upon the determining.

In addition, the method may include, at 410, dynamically updating an available storage capacity of the virtual secondary storage disk based upon usage of the physical storage capacity by the virtual primary storage disk and the virtual secondary storage disk. As such, as the primary storage disk uses the available storage capacity, the remaining storage capacity available for the secondary storage disk(s) may be correspondingly reduced. In an aspect, the remaining storage capacity may be reduced by the portion used by the virtual primary storage disk. In another aspect, a minimum threshold amount of the physical storage capacity may be maintained for the virtual primary storage disk. As such, as the primary storage disk uses the available storage capacity, the remaining storage capacity available for the secondary storage disk(s) may be decreased by a sum of the portion used by the virtual primary storage disk and the minimum threshold. In addition, as the primary storage disk frees space, the newly available space would become available for use by the secondary storage disk(s). Therefore, the sharing of the physical storage between the primary storage disk and the secondary storage disk(s) may be fluid and dynamically adjusted based upon the resources used by the primary storage disk. In an aspect, update component 50 (FIG. 2) may update the storage capacity of the virtual secondary storage disk based upon the usage of the physical storage capacity by the virtual primary storage disk and the virtual secondary storage disk.

Figure 5:
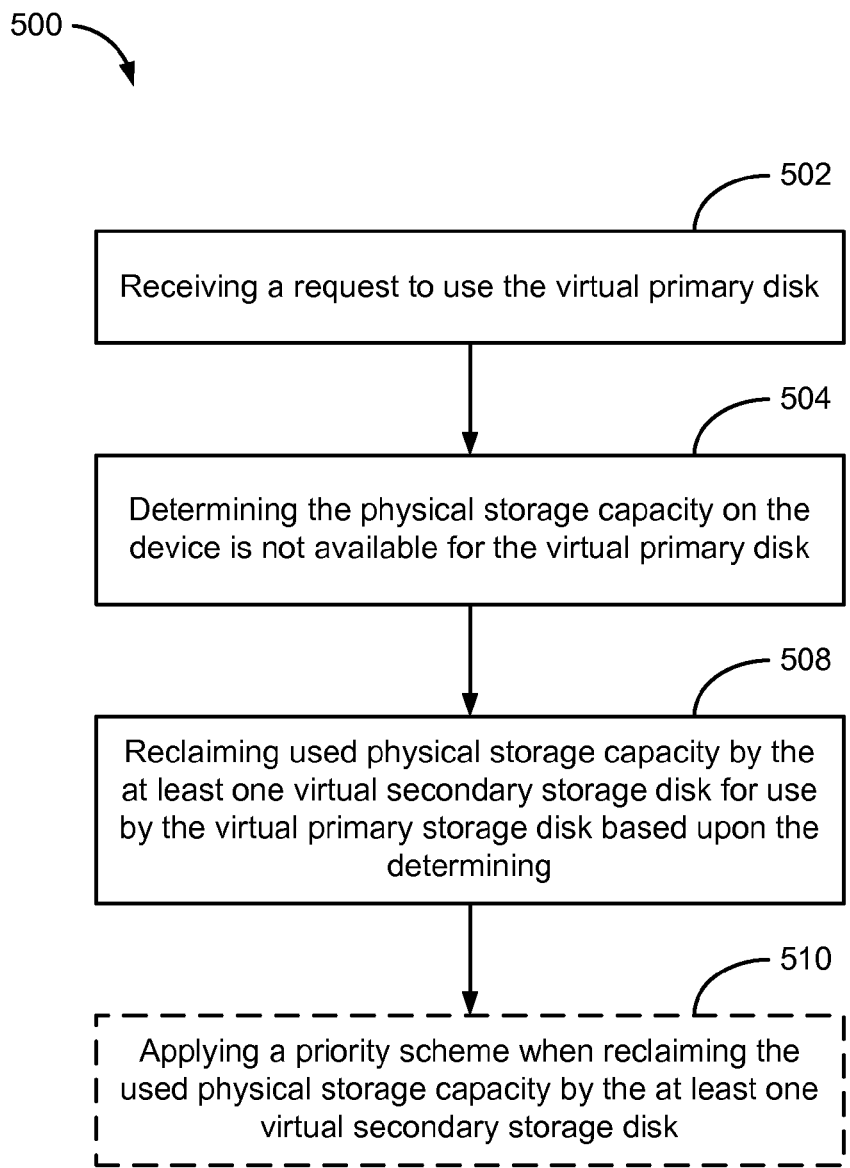
FIG. 5 is a flow chart illustrating a method for reclaiming physical storage capacity in accordance with an aspect.

Referring now to FIG. 5, a method 500 for reclaiming physical storage capacity in accordance with an aspect includes, at 502, receiving a request to use the virtual primary disk. The virtual primary storage disk may have access to the entire storage capacity available on the physical storage disk. In an aspect, the secondary storage disk(s) may have access to the remaining storage capacity (e.g., remaining storage capacity=total physical storage capacity− primary storage capacity used) on the physical storage disk, e.g., for use by the cloud. For example, resource allocation component 14 (FIG. 1) may receive a request to use to the virtual primary disk.

The method may also include, at 504, determining the physical storage capacity on the device is not available for the virtual primary disk. For example, the virtual primary storage disk may request to use a portion of the physical storage capacity that is not currently available (e.g., the secondary storage capacity is currently using an amount of storage greater than or equal to the requested portion). In an aspect, the resource allocation component 14 may determine that the physical storage capacity on the device is not currently available for the virtual primary disk.

In addition, the method may include, at 508, reclaiming used physical storage capacity by the at least one virtual secondary storage disk for use by the virtual primary storage disk based upon the determining. The virtual primary storage disk 18 may have access to the total physical storage capacity of the physical storage disk 16 at any time. In an aspect, when all of the available storage capacity of the physical storage disk are currently being used by the primary storage disk and the secondary storage disk(s), a reclaim component 48 (FIG. 3) may reclaim some or all of the storage capacity being used by the secondary storage disk(s) so that the primary storage disk may immediately use the reclaimed storage capacity to save the data. Therefore, when storage space is not available for the primary storage disk, the primary storage disk may reclaim the storage space being used by the secondary storage disk(s) for use by the primary storage disk without having to negotiate with the secondary storage disk(s) for the reclaimed space.

The method may optionally include, at 510, applying a priority scheme when reclaiming the used physical storage capacity by the at least one virtual secondary storage disk. For example, one or more algorithms may be used in determining which storage capacity to reclaim from secondary storage disk(s) for use by the primary storage disk. The algorithms may be based upon a priority of files, frequency of use of files, and/or when the files were last accessed, among other methods for reclaiming storage capacity. In an aspect, the priority scheme may be received from the cloud. For example, rules component 52 (FIG. 3) may apply a priority to the data, e.g., files, saved on secondary storage disk(s) to reclaim the storage capacity used by the files with the lower priority first.

Figure 6:
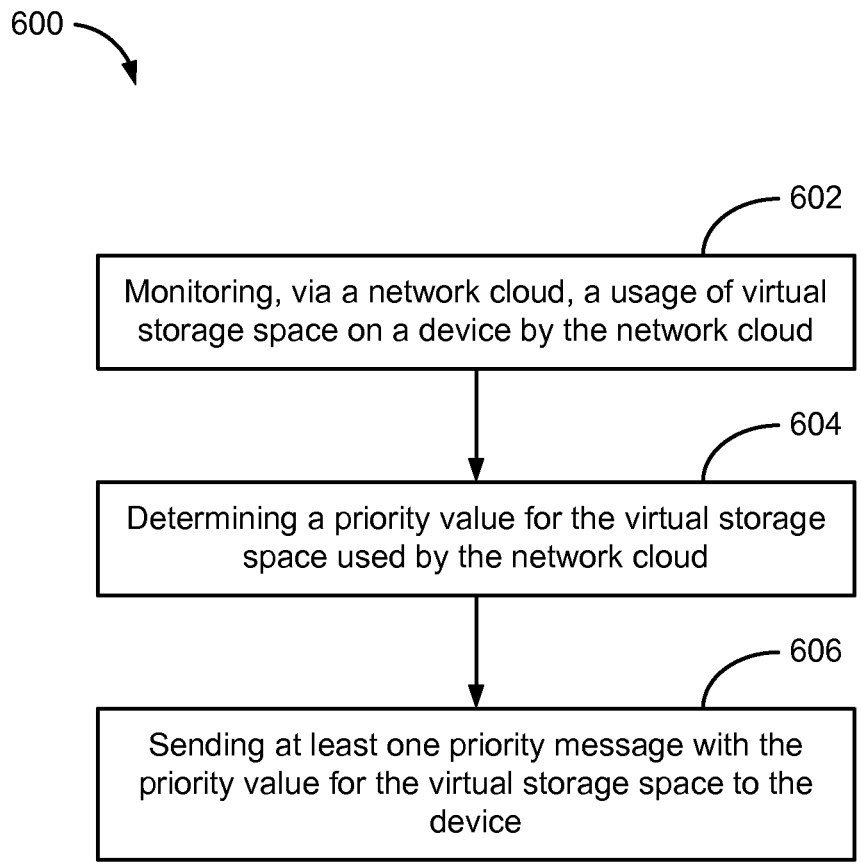
FIG. 6 is a flow chart illustrating a method for assigning a priority value to virtual storage space in accordance with another aspect.

Referring now to FIG. 6, a method 600 for assigning a priority value to virtual storage space in accordance with an aspect includes, at 602, monitoring, via a network cloud, a usage of virtual storage space on a device by the network cloud. For example, the network cloud may have access to a plurality of virtual storage resources from a plurality of devices in communication with the network cloud. The network cloud may monitor the usage of virtual storage space on each device by the network cloud. In an aspect, a virtual space monitor component 26 (FIG. 2) may monitor the usage of virtual storage space on a device.

The method may also include, at 604, determining a priority value for the virtual storage space used by the network cloud. The priority value may be used to determine which order the virtual storage space may be reclaimed by the primary storage on a device (e.g., reclaim the storage capacity used by the data with the lower priority first). For example, data that is important may have a higher priority relative to data that is not as important. In addition, data with multiple copies stored on the cloud may have a lower priority relative to data that does not have multiple copies stored on the cloud. Moreover, data that has been recently accessed may have a higher priority relative to data that has not been accessed recently. In an aspect, determining component 34 (FIG. 2) may assign a priority to the data being stored by the virtual storage.

The method may further include, at 606, sending at least one priority message with the priority value for the virtual storage space to the device. The priority value may be used by the device to determine an order in which the virtual storage space should be reclaimed by the device. For example, a notification component 38 (FIG. 2) may send the priority messages to device 102 (FIG. 2). It should be noted that the priority of the virtual storage may be dynamically updated as data is added and/or removed from the virtual storage. Thus, the notification component 38 may send an updated priority messages 40 to device 102 as the priority of the virtual storage is updated.

Figure 7A:
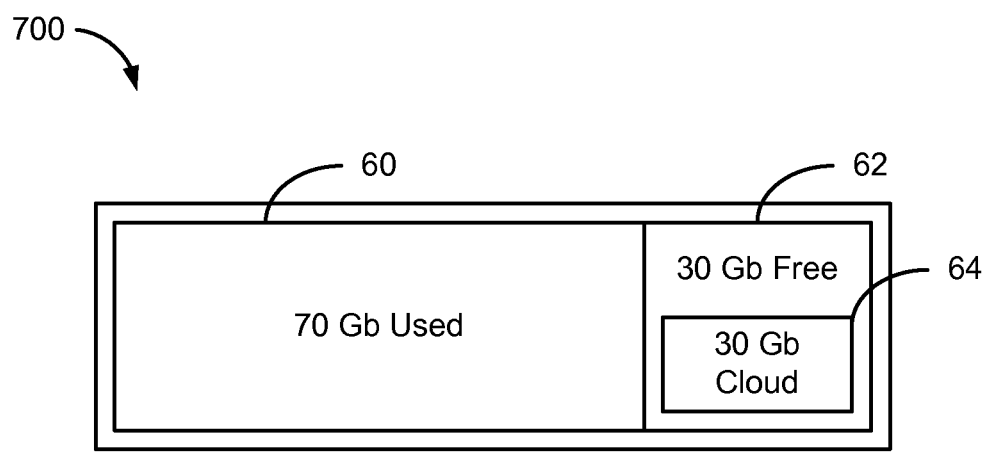
FIGS. 7A and 7B illustrate example disk storage in accordance with an aspect.
Figure 7B:
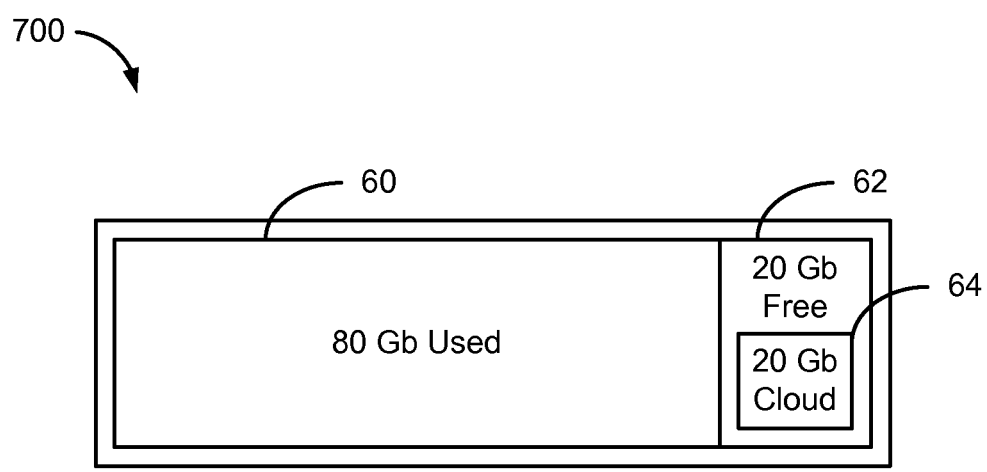

Referring now to FIGS. 7A and 7B, illustrated therein is an example disk storage in accordance with an aspect. FIG. 7A illustrates an example of physical storage 700 having 100 Gb of space, where 70 Gb is used by the primary storage 60 and 30 Gb is free 62. As illustrated, both the primary storage 60 and the cloud 64 have equal access to the 30 Gb of free space 62. In this aspect, the cloud 64 has no guarantee that the host will not reclaim or use the free space 62.

FIG. 7B illustrates an example of physical storage 700, where the primary storage 60 uses an additional 10 Gb of free space so that a total of 80 Gb is used by the primary storage 60 and 20 Gb remains free space 62. In this aspect, the primary storage 60 has priority over the cloud 64 to use any free space 62 or reclaim disk space being used by the cloud 64. While both the primary storage 60 and the cloud 64 have access to the 20 Gb of free space 62, the primary storage 60 is able to use 10 Gb of the free space without having to negotiate with the cloud 64 for additional space. Thus, the primary storage 60 "sees" any free disk space and the disk space used by the cloud 64 as "available" disk space. As the primary storage 60, fills the disk space, the storage available to or used by the cloud 64 is reclaimed. In this example, the cloud 64 still has access to the remaining 20 Gb of free space 62 to use.

Figure 8:
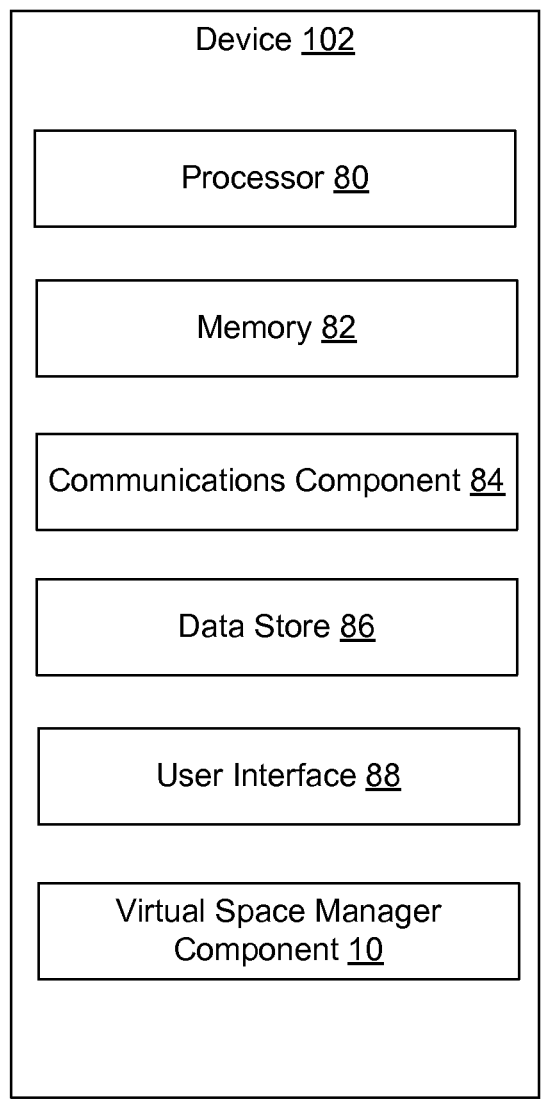
FIG. 8 illustrates an example device operable within the connectivity system in accordance with yet another aspect.

Referring now to FIG. 8, illustrated is an example device 102 operable within the connectivity system in accordance with an aspect. In one aspect, device 102 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Device 102 may further include a memory 82, such as for storing local versions of applications being executed by processor 80. Memory 82 can include a type of memory usable by a computer, such as random access memory (RAM), read only memory (ROM), tapes, magnetic discs, optical discs, volatile memory, non-volatile memory, and any combination thereof.

Further, device 102 includes a communications component 84 that provides for establishing and maintaining communications with one or more parties utilizing hardware, software, and services as described herein. Communications component 84 may carry communications between components on device 102, as well as between device 102 and external devices, such as devices located across a communications network and/or devices serially or locally connected to device 102. For example, communications component 84 may include one or more buses, and may further include transmit chain components and receive chain components associated with a transmitter and receiver, respectively, operable for interfacing with external devices.

Additionally, device 102 may further include a data store 86, which can be any suitable combination of hardware and/or software, that provides for mass storage of information, databases, and programs employed in connection with aspects described herein. For example, data store 86 may be a data repository for applications not currently being executed by processor 80.

Device 102 may additionally include a user interface component 88 operable to receive inputs from a user of device 102 and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Device 102 may also include a virtual space manager component 10 (FIG. 1) operable to manage the available space for the primary storage disk and the one or more secondary storage disk(s). In an aspect, user interface component 88 may transmit and/or receive messages corresponding to the operation of virtual space manager component 10. In addition, processor 80 executes virtual space manager component 10, and memory 82 or data store 86 may store them.

Figure 9:
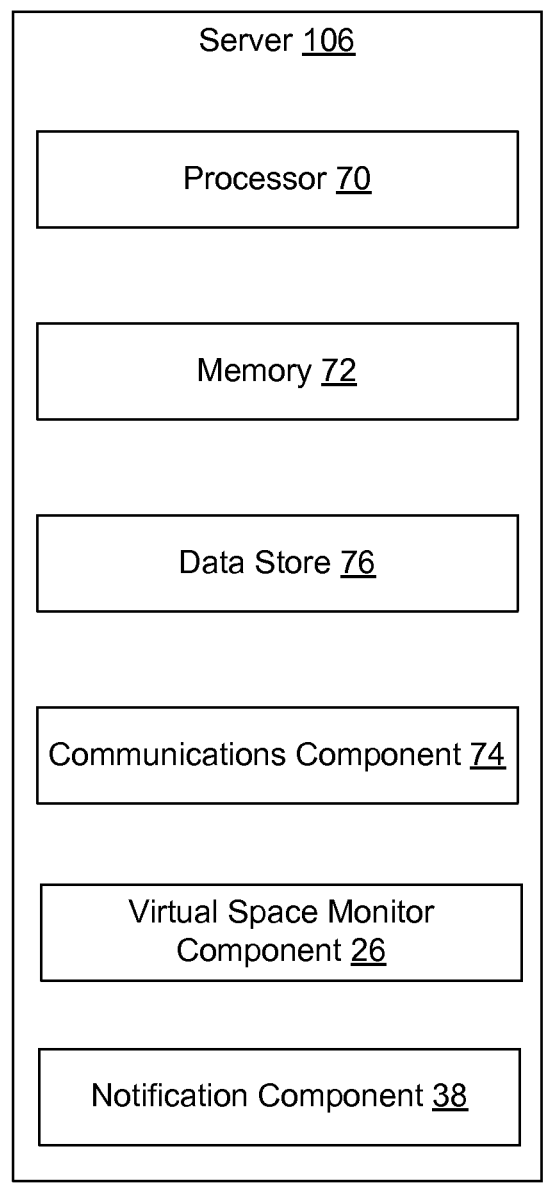
FIG. 9 illustrates an example server device operable within the connectivity system in accordance with an aspect.

Referring now to FIG. 9, illustrated is an example server device 106 operable within the connectivity system in accordance with yet another aspect. Server 106 manages network connectivity matters for access network 104. Server 106 includes processor component 70 for carrying out processing functions associated with one or more of components and functions described herein. Processor component 70 can include a single or multiple set of processors or multi-core processors. Moreover, processing component 70 can be implemented as an integrated processing system and/or a distributed processing system.

Server 106 further includes a memory 72, such as for storing local versions of applications being executed by processor component 70. Memory 72 can include random access memory (RAM), read only memory (ROM), and a combination thereof.

Further, server 106 includes a communications component 74 that provides for establishing and maintaining communications with one or more parties utilizing hardware, software, and services as described herein. Communications component 74 may carry communications between components on server 106, as well as between server 106 and external devices, such as devices located across a communications network and/or devices serially or locally connected to server 106.

Additionally, server 106 may further include a data store 76, which can be any suitable combination of hardware and/or software, that provides for mass storage of information, databases, and programs employed in connection with aspects described herein. For example, data store 76 may be a data repository for applications not currently executing.

Server 106 may also include a virtual space monitor component 26 (FIG. 1) operable to monitor the various virtual storage(s) 28 being used by server 106. Server 106 may also include a notification component 38 (FIG. 1) operable to operable to send priority message(s) to device 102 (FIG. 1). In an aspect, communications component 74 may transmit and/or receive messages corresponding to the operation of virtual space monitor component 26 and/or notification component 38. In addition, processor 70 may execute virtual space monitor component 26 and/or notification component 38, and memory 72 may store them.

Figure 10:
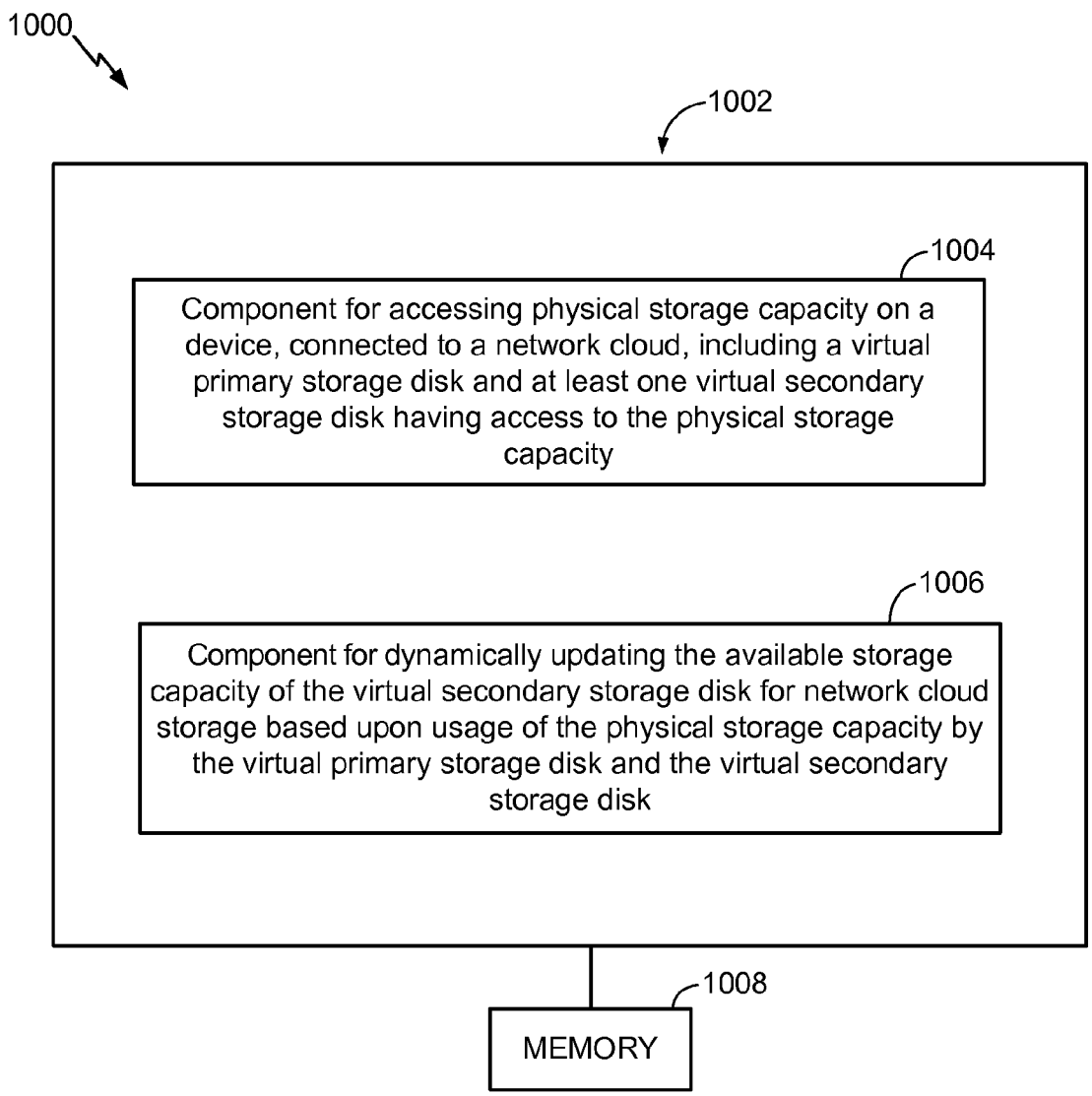
FIG. 10 illustrates an example system that facilitates providing resources for cloud storage in accordance with another aspect.

Referring now to FIG. 10, illustrated is a system 1000 configured to provide resources for cloud storage. For example, system 1000 can reside at least partially within a transmitter, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that facilitate providing resources for cloud storage. For instance, logical grouping 1002 may include component 1004 for accessing physical storage capacity on a device, connected to a network cloud, including a virtual primary storage disk and at least one virtual secondary storage disk having access to the physical storage capacity. Further, logical grouping 1002 may comprise component 1006 for dynamically updating the available storage capacity of the virtual secondary storage disk for network cloud storage based upon usage of the physical storage capacity by the virtual primary storage disk and the virtual secondary storage disk. Additionally, system 1000 can include a memory 1008 that retains instructions for executing functions associated with electrical components 1004 and 1006. While shown as being external to memory 1008, it is to be understood that one or more of electrical components 1004 and 1006 can exist within memory 1008.

Figure 11:
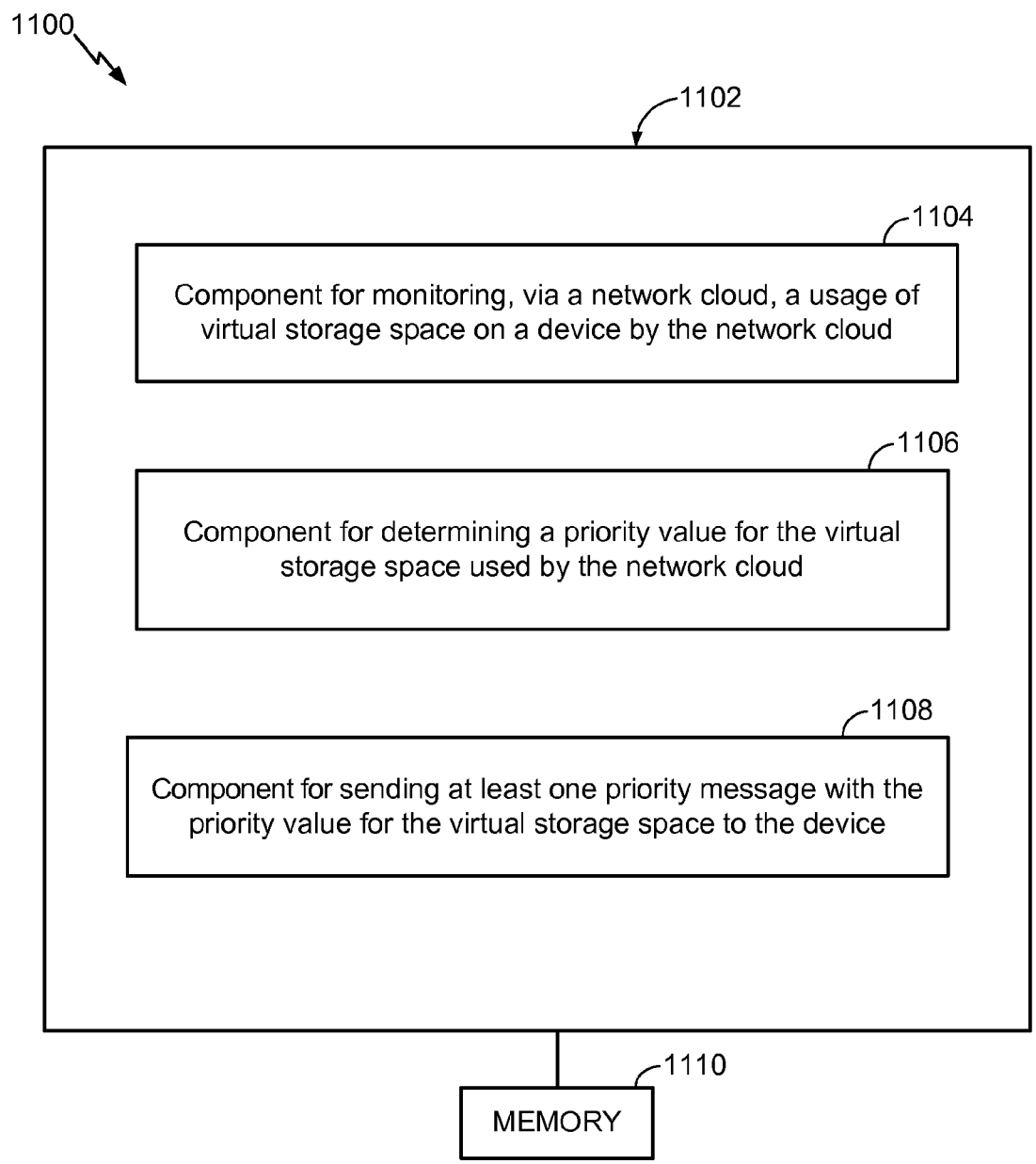
FIG. 11 illustrates an example system that facilitates assigning a priority value to virtual storage space in accordance with an aspect.

Referring now to FIG. 11, illustrated is a system 1100 configured to assign a priority value to virtual storage space. For example, system 1100 can reside at least partially within a transmitter, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that facilitate assigning a priority value to virtual storage space. For instance, logical grouping 1102 may include component 1104 for monitoring, via a network cloud, a usage of virtual storage space on a device by the network cloud. Further, logical grouping 1102 may comprise component 1106 for determining a priority value for the virtual storage space used by the network cloud. In addition, logical grouping 1102 may include component 1108 for sending at least one priority message with the priority value for the virtual storage space to the device. Additionally, system 1100 can include a memory 1110 that retains instructions for executing functions associated with electrical components 1104, 1106, and 1108. While shown as being external to memory 1110, it is to be understood that one or more of electrical components 1104, 1106, and 1108 can exist within memory 1110.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or implementations, it should be noted that various changes and modifications could be made herein without departing from the scope of the described aspects and/or implementations as defined by the appended claims. Furthermore, although elements of the described aspects and/or implementations may be described or claimed in the singular, the plural is contemplated unless limitation to the singular is explicitly stated. Additionally, all or a portion of any aspect and/or implementation may be utilized with all or a portion of any other aspect and/or implementation, unless stated otherwise.

What is claimed is:

1. A method for providing resources for cloud storage, comprising:
   accessing physical storage capacity on a device, connected to a network cloud, including a virtual primary storage disk and at least one virtual secondary storage disk having access to the physical storage capacity;
   utilizing, by the virtual primary storage disk, a portion of the physical storage capacity; and
   dynamically updating the available physical storage capacity of the at least one virtual secondary storage disk for network cloud storage based upon usage of the physical storage capacity by the virtual primary storage disk and the at least one virtual secondary storage disk, wherein dynamically updating the available physical storage capacity of the at least one virtual secondary storage disk comprises decreasing the available physical storage capacity of the at least one virtual secondary storage disk by the portion utilized by the virtual primary storage disk.

2. The method of claim 1, wherein dynamically updating the available physical storage capacity of the at least one virtual secondary storage disk for the network cloud storage includes decreasing the available physical storage capacity when the virtual primary storage disk uses at least the portion of the physical storage capacity.

3. The method of claim 1, wherein dynamically updating the available physical storage capacity of the at least one virtual secondary storage disk for the network cloud storage includes increasing the available physical storage capacity when the virtual primary storage disk releases used physical storage capacity.

4. The method of claim 1, further comprising:
   reclaiming used physical storage capacity on the at least one virtual secondary storage disk for use by the virtual primary storage disk based upon determining that the physical storage capacity on the device is not available for the virtual primary storage disk.

5. The method of claim 4, wherein the used physical storage capacity is reclaimed based upon a priority scheme.

6. The method of claim 5, wherein the priority scheme is received from the network cloud.

7. The method of claim 4, wherein the used physical storage capacity is reclaimed based upon a frequency of use scheme or an access time scheme.

8. The method of claim 1, further comprising using the available physical storage capacity of the at least one virtual secondary storage disk for the network cloud storage, wherein the at least one virtual secondary storage disk includes a plurality of virtual secondary storage disks.

9. The method of claim 1, further comprising:
   maintaining a minimum threshold amount of the physical storage capacity for the virtual primary storage disk.

10. The method of claim 9,
    wherein the available physical storage capacity of the at least one virtual secondary storage disk is decreased by a sum of the portion utilized by the virtual primary storage disk and the minimum threshold amount.

11. The method of claim 1, further comprising:
    receiving a request to use the portion of the physical storage capacity for the virtual primary storage disk;
    immediately utilizing the portion of the physical storage capacity when the available physical storage capacity of the at least one virtual secondary storage disk is greater than or equal to the portion; and
    reclaiming used physical storage capacity on the at least one virtual secondary storage disk for use by the virtual primary storage disk based upon determining that the available physical storage capacity of the at least one virtual secondary storage disk is less than the portion.

12. At least one processor configured for providing resources for cloud storage, comprising:
- a first module configured to access physical storage capacity on a device, connected to a network cloud, including a virtual primary storage disk and at least one virtual secondary storage disk having access to the physical storage capacity; and
- a second module configured to dynamically update the available physical storage capacity of the at least one virtual secondary storage disk for network cloud storage based upon usage of the physical storage capacity by the virtual primary storage disk and the at least one virtual secondary storage disk, wherein the second module is configured to decrease the available physical storage capacity of the at least one virtual secondary storage disk by a portion of the physical storage capacity utilized by the virtual primary storage disk.

13. A non-transitory computer-readable medium, comprising one or more instructions configured to cause a computer to:
- access physical storage capacity on a device, connected to a network cloud, including a virtual primary storage disk and at least one virtual secondary storage disk having access to the physical storage capacity; and
- dynamically update the available physical storage capacity of the at least one virtual secondary storage disk for network cloud storage based upon usage of the physical storage capacity by the virtual primary storage disk and the at least one virtual secondary storage disk, wherein the dynamically updated available physical storage capacity of the at least one virtual secondary storage disk is decreased by a portion of the physical storage capacity utilized by the virtual primary storage disk.

14. An apparatus, comprising:
- means for accessing physical storage capacity on a device, connected to a network cloud, including a virtual primary storage disk and at least one virtual secondary storage disk having access to the physical storage capacity; and
- means for dynamically updating the available physical storage capacity of the at least one virtual secondary storage disk for network cloud storage based upon usage of the physical storage capacity by the virtual primary storage disk and the at least one virtual secondary storage disk, wherein the dynamically updated available physical storage capacity of the at least one virtual secondary storage disk is decreased by a portion of the physical storage capacity utilized by the virtual primary storage disk.

15. An apparatus for providing resources for cloud storage, comprising:
- an access component operable to access physical storage capacity on a device, connected to a network cloud, including a virtual primary storage disk and at least one virtual secondary storage disk having access to the physical storage capacity;
- a resource allocation component operable to use, by the virtual primary storage disk, a portion of the physical storage capacity; and
- an update component operable to dynamically update the available physical storage capacity of the at least one virtual secondary storage disk for network cloud storage based upon usage of the physical storage capacity by the virtual primary storage disk and the at least one virtual secondary storage disk, wherein the update component is further operable to decrease the available physical storage capacity of the at least one virtual secondary storage disk by the portion utilized by the virtual primary storage disk.

16. The apparatus of claim 15, wherein the update component is operable to decrease the available physical storage capacity of the at least one virtual secondary storage disk for the network cloud storage when the virtual primary storage disk uses at least the portion of the physical storage capacity.

17. The apparatus of claim 15, wherein the update component is further operable to increase the available physical storage capacity of the at least one virtual secondary storage disk for the network cloud storage when the virtual primary storage disk releases used physical storage capacity.

18. The apparatus of claim 15, further comprising a reclaim component operable to reclaim used physical storage capacity on the at least one virtual secondary storage disk for use by the virtual primary storage disk based upon a determination that the physical storage capacity on the device is not available for the virtual primary storage disk.

19. The apparatus of claim 18, wherein the used physical storage capacity is reclaimed based upon a priority scheme.

20. The apparatus of claim 19, wherein the priority scheme is received from the network cloud.

21. The apparatus of claim 18, wherein the used physical storage capacity is reclaimed based upon a frequency of use scheme or an access time scheme.

22. The apparatus of claim 15, wherein the resource allocation component is further operable to use the available physical storage capacity of the at least one virtual secondary storage disk for the network cloud storage, and wherein the at least one virtual secondary storage disk includes a plurality of virtual secondary storage disks.

23. The apparatus of claim 15, wherein the
- resource allocation component is further operable to maintain a minimum threshold amount of the physical storage capacity for the virtual primary storage disk.

24. The apparatus of claim 23,
- wherein the update component is operable to decrease the available physical storage capacity of the at least one virtual secondary storage disk by a sum of the portion utilized by the virtual primary storage disk and the minimum threshold amount.

25. The apparatus of claim 15, wherein:
- the resource allocation component is further operable to receive a request to use the portion of the physical storage capacity for the virtual primary storage disk;
- the access component is further operable to immediately use the portion of the physical storage capacity when the available physical storage capacity of the at least one virtual secondary storage disk is greater than or equal to the portion; and
- the apparatus further comprises a reclaim component operable to reclaim used physical storage capacity on the at least one virtual secondary storage disk for use by the virtual primary storage disk based upon a determination that the available physical storage capacity of the at least one virtual secondary storage disk is less than the portion.

* * * * *